July 5, 1960 P. PEGARD 2,943,538
GEAR CUTTING MACHINE
Filed May 11, 1956 2 Sheets-Sheet 1

United States Patent Office 2,943,538
Patented July 5, 1960

2,943,538
GEAR CUTTING MACHINE

Pierre Pegard, Courbevoie, France, assignor to Ateliers G.S.P., Courbevoie, France, a French society Filed May 11, 1956, Ser. No. 584,365

Claims priority, application France May 14, 1955

6 Claims. (Cl. 90—4)

This invention relates to gear cutting machine, and an important object of the invention is to provide an improved general arrangement for the frame and the relatively movable components of such a machine.

In conventional gear cutting machines the frame is usually formed as a generally inverted L or a T-shaped structure with the work carrier and the cutter tool carrier both slidably supported beneath an overhanging cross member of the frame. The cutter carrier is usually movable on horizontal ways parallel to said cross member. Such a lay-out has the disadvantage of restricting the accessibility to the components of the machine, and it is a first object of the invention to provide an improved lay-out whereby access to the work and cutter carrier will both be greatly improved. Another object is to improve the stability of the work carrier during its relative displacements with respect to the frame, so as to improve the behaviour of the machine in service and permit more accurate gear cutting operations to be performed.

In conventional gear cutting machines, both the work and the cutter tool are usually rotated from a common power source, there being a mechanical drive transmission between the work carrier shaft and the cutter shaft. The presence of such a drive transmission gives rise to certain objectionable requirements in the mounting of the carriers, particularly in that it requires a cutter shaft of substantial length to be provided which detracts from the rigidity of the cutter carrier assembly. It is therefore an additional object of the invention to do away with the requirement for such a mechanical transmission between the cutter carrier and work carrier. Another object is to simplify the construction of the machine and increase the rigidity of the cutter carrier by eliminating such transmission. Simultaneously it is an object to improve the accuracy of gear cutting operations by eliminating the adverse effects of time lag, inertia, lost motion, and the like, inherent to the presence of a mechanical transmission between the tool carrier and the work carrier.

According to an aspect of this invention, there is provided a gear cutting machine comprising a frame having two upstanding frame surfaces directed towards each other at an angle of approximately 90°, a work-carrier assembly slidably supported from one frame surface and a cutter carrier assembly slidably supported from the other frame surface in relative positions permitting gear-cutting cooperation between the cutter and work, and means for concurrently operating said cutter and work to cut gear teeth on the latter.

Preferably, the work and the cutter are driven from respective electric motors separately mounted on the respective carrier assemblies, suitable means such as an electronic synchronizing circuit being provided for synchronizing the operation of both motors.

The invention will now be described in greater detail with reference to the accompanying drawings illustrating one form of embodiment thereof by way of illustration but not of limitation.

Figure 1:
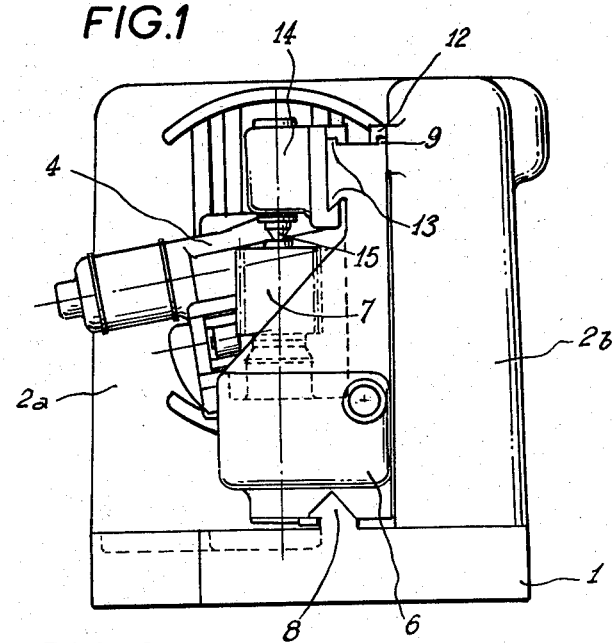
Fig. 1 is a side view of a gear cutting machine according to the invention.

As shown the machine is supported on a base 1 having two horizontal leg portions 1a and 1b at right angles to each other respectively supporting frame standards 2a and 2b. Formed on standard 2b are two horizontal slideways 8 and 9, slideway 8 being formed at the bottom of the standard and way 9 near the top thereof. A work carrier assembly 6 is slidably mounted on ways 8 and 9 for horizontal displacement relatively to the frame standard 2b. It will be noted that the work carrier assembly 6 is thus entirely supported on the bottom slideway 8 which is preferably formed with a narrow transverse dimension, while said assembly is effectively guided by the upper way 9 removed a considerable distance above the lower way. In this manner accurate and stable support is achieved for the work. The work carrier assembly 6 is moreover formed with a horizontal extension or nose 6a which imparts further stability thereto and is arranged to be at all times positioned within a aperture 10 formed in the standard 2a, so as to protect the lower slideway 8 against chips and cuttings falling from the work. Clamping jaws may be provided as indicated at 11 and 12 for clamping the top and bottom of the work carrier and thus locking the work assembly rigidly with the frame during a cutting operation.

Formed on the work carrier 6 is a slideway 13 slidably receiving thereon a sliding puppet 14 from which a tailstock 15 projects downwardly. A workpiece is shown at 7 as received between tailstock 15 and a suitable bottom support 25 projecting upwardly from a bottom portion of the work carrier 6. The slidable mounting of the tailstock assembly as just described facilitates ready positioning of the work, in that the tailstock assembly 14—15 may be shifted sideways along the way 13 to clear the work and then restored to its normal position in vertical alignment with the work support, such alignment being facilitated by a stop such as 16 determining the centred or aligned position of the tailstock assembly relative to the work carrier. An electric motor 22 supported from the outer end of the work carrier serves to rotate the wokpiece 7, and may simultaneously serve to displace the work carrier by conventional driving connections such as a rack and pinion (not shown).

Supported on the inwardly directed side of standard 2a is a duel set of slideways 17 which are mounted on the standard through suitable rotatable means, schematically illustrated in the drawings but not described in detail since such means may be conventional, whereby the set of ways 17 may be angularly adjusted in the vertical plane of the standard 2a. Slidably mounted on the ways 17 is a cutter-carrying assemby 4. It will be understood by those famiiar with the gear-cutting are that the angular adjustability of the direction of the tool carrier traverse by angular adjustment of the ways 17 in a vertical plane, will permit the cutting of helical gear teeth by the well-known method involving a rectilineal feed of the cutter tangentially to the gear helix. Jaws such as 18 serve to lock the cutter carrier on its ways.

Access to the cutter carrier assembly from outside the machine is facilitated by a wide window aperture 19 formed adjacent thereto in the standard 2a. It will be noted moreover that the wall of standard 2b is suitably cut out as shown at 20 for providing the requisite clearance to accommodate the tool carrier assembly 4 in any operative position assumed thereby.

The tool carrier 4 is shown as supporting a suitable tool such as a milling-cutter 5 driven from an electric motor 21 supported in the tool carrier assembly 4. Change speed gearing is preferably incorporated in the assembly 4 between the motor and the cutter.

Figure 2:
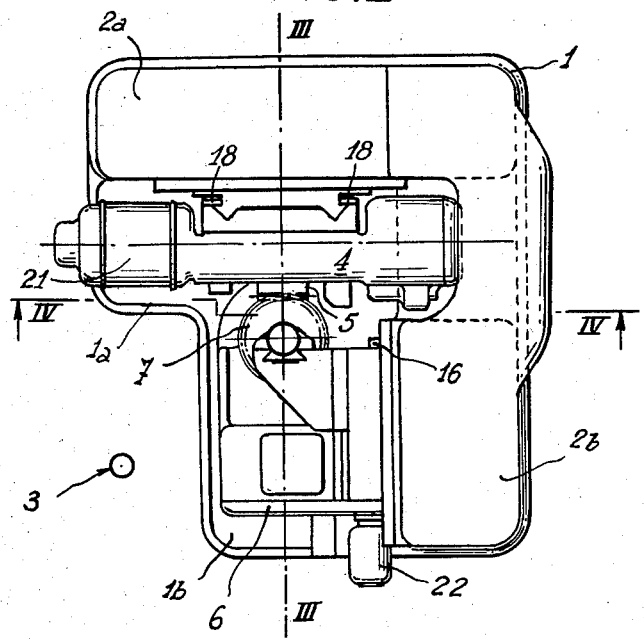
Fig. 2 is a plan view thereof.
Figure 3:
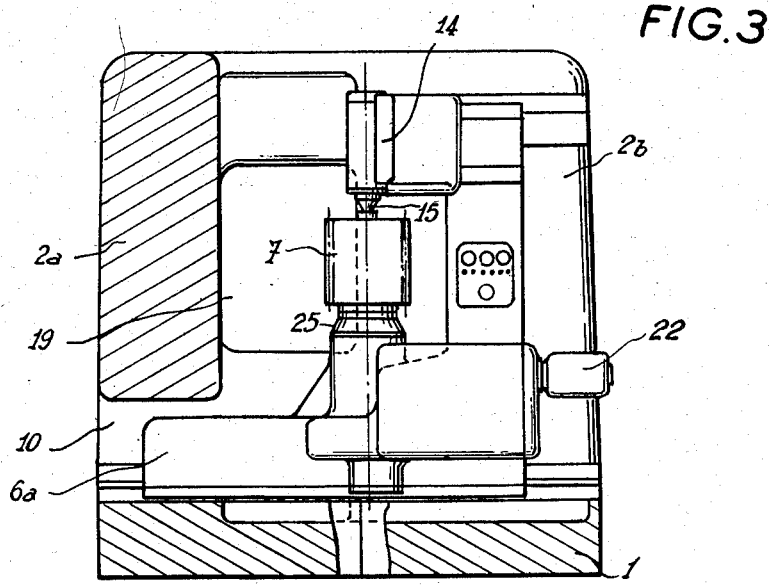
Fig. 3 is a side view of the machine with the cutter carrier removed and with the frame in section on line III—III of Fig. 2.
Figure 4:
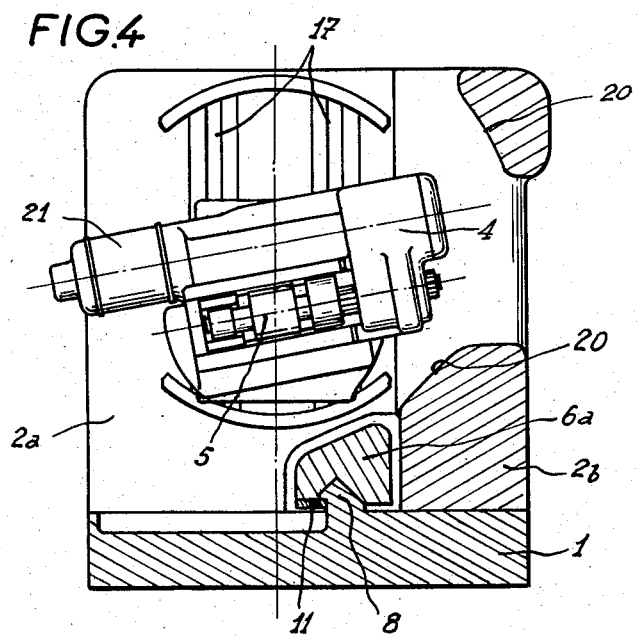
Fig. 4 is a section on line IV—IV of Fig. 3.

During operation of the machine, the operator may be stationed substantially as indicated at 3 in Fig. 2 so as to have ready access both to the tool carrier assembly 4 and the work carrier assembly 6. The various controls (not shown) such as push button switches for starting and stopping the electric motors 21 and 22, are preferably located at suitable locations for convenient actuation by the operator when stationed as shown at 3.

It will be understood that for a given gear cutting operation, some means must be provided for synchronizing the rotation of both motors 21 and 22. Such means may comprise electrical or electronic synchronizing circuits of any suitable conventional type and have not been illustrated herein since circuits suitable for synchronizing the speed of rotation of two motors are well known to those familiar with the art.

The use of separate synchronized motors for driving the work and the tool in a gear cutting machine according to the invention has considerable practical advantages. Elimination of the more usual mechanical transmission not only leads to simpler structure, but more important, it eliminates the objectionable inertia and time lag due to lost motion, etc., inherent to such transmissions, which effects detract from the accuracy of the gear cutting. In many conventional types of transmission between the work and the tool, it is found that as the cutter engages the work, the rotation of the cutter is retarded and the transmission mechanism is not usually sensitive and accurate enough to transmit such retardation to the work, or does so only after a substantial time has elapsed, with the result that the side of the tooth is cut into more deeply than it should be. Elimination of the transmission mechanism likewise makes it possible substantially to improve the lay-out of the machine, by reducing the unsupported length of the cutter carrier. In conventional machines the mechanical transmission is required to follow the milling cutter throughout all of the positions assumed thereby in operation, thus requiring the milling cutter to be mounted in a substantially overhanging or cantilever condition which has obvious disadvantages from a mechanical standpoint, and these disadvantages are removed according to the invention through the use of independent synchronized drive motors.

It will be understood that the illustrated embodiment of my improved gear cutting machine is exemplary only, since many departures may be made therefrom within the scope of the ensuing claims.

What I claim is:

1. In a gear cutting machine, a frame comprising a base portion and two stationary upstanding frame sections substantially at right angles, first and second slideway means respectively provided on inwardly directed surfaces of said frame sections, a work carrier assembly slidably mounted on said first slideway means and a cutter carrier assembly slidably mounted on the said second slideway means, drive means connected with said assemblies and operable for cutting gear teeth on said work, and controls for operating said drive means positioned for convenient actuation from an operator's station within the angle defined by said frame sections.

2. A gear-cutting machine as claimed in claim 1, wherein said first slideway means include a bottom horizontal slideway and a top horizontal slideway parallel thereto and spaced a substantial amount thereabove.

3. A gear-cutting machine as claimed in claim 1, wherein said first slideway means include a bottom horizontal slideway having a transverse dimension substantially smaller than that of said work carrier assembly, and a top horizontal slideway parallel to and spaced a substantial distance above said bottom slideway.

4. A gear cutting machine as claimed in claim 1, wherein said first slideway means include a bottom horizontal slideway and a top horizontal slideway parallel to and spaced a substantial distance above said bottom slideway, said work carrier assembly including a base portion slidably engaging said bottom slideway and substantially greater in transverse dimension than it, said base portion having a longitudinal extension at least at one end thereof so as to increase the longitudinal length of engagement between said base and said bottom slideway, and said work carrier assembly further including a top portion slidably engaging said top slideway.

5. A gear cutting machine as claimed in claim 1, wherein said work carrier assembly has opposed work supporting and centering means thereon, and means for slidably mounting one of said opposed means on said assembly in a direction normal to the center axis of a workpiece mounted between said opposed means.

6. In a gear-cutting machine, a frame comprising a base portion and two stationary generally vertical frame surfaces directed towards each other at an angle, first slideway means on one surface and second slideway means on the other surface, means mounting one of said slideway means for rotational adjustment relatively to the frame about an axis normal to the related surface, a work-carrier assembly having ways slidably engaging said first slideway means and a cutter assembly having ways slidably engaging said second slideway means, means supported on said work assembly for rotating said work and means supported on said cutter assembly for rotating the cutter to cut gear teeth on the work.

References Cited in the file of this patent

UNITED STATES PATENTS

| | | |
|---|---|---|
| 1,677,853 | Schurr | July 17, 1928 |
| 1,965,002 | Richer | July 3, 1934 |
| 2,092,587 | Olson | Sept. 7, 1937 |
| 2,585,271 | Praeg | Feb. 12, 1952 |
| 2,674,145 | Von Zelewsky | Apr. 6, 1954 |
| 2,769,375 | Moncrieff | Nov. 6, 1956 |
| 2,851,910 | Zwick | Sept. 16, 1958 |
| 2,857,817 | Zimmerman et al. | Oct. 28, 1958 |

FOREIGN PATENTS

| | | |
|---|---|---|
| 508,744 | Great Britain | July 5, 1939 |
| 529,162 | Great Britain | Nov. 15, 1940 |